May 29, 1956
T. S. HOLMES
2,747,692
FOOT ACTUATED, GROUND ENGAGING BRAKE
FOR HAND TRUCKS AND THE LIKE
Filed Sept. 29, 1952
2 Sheets-Sheet 1
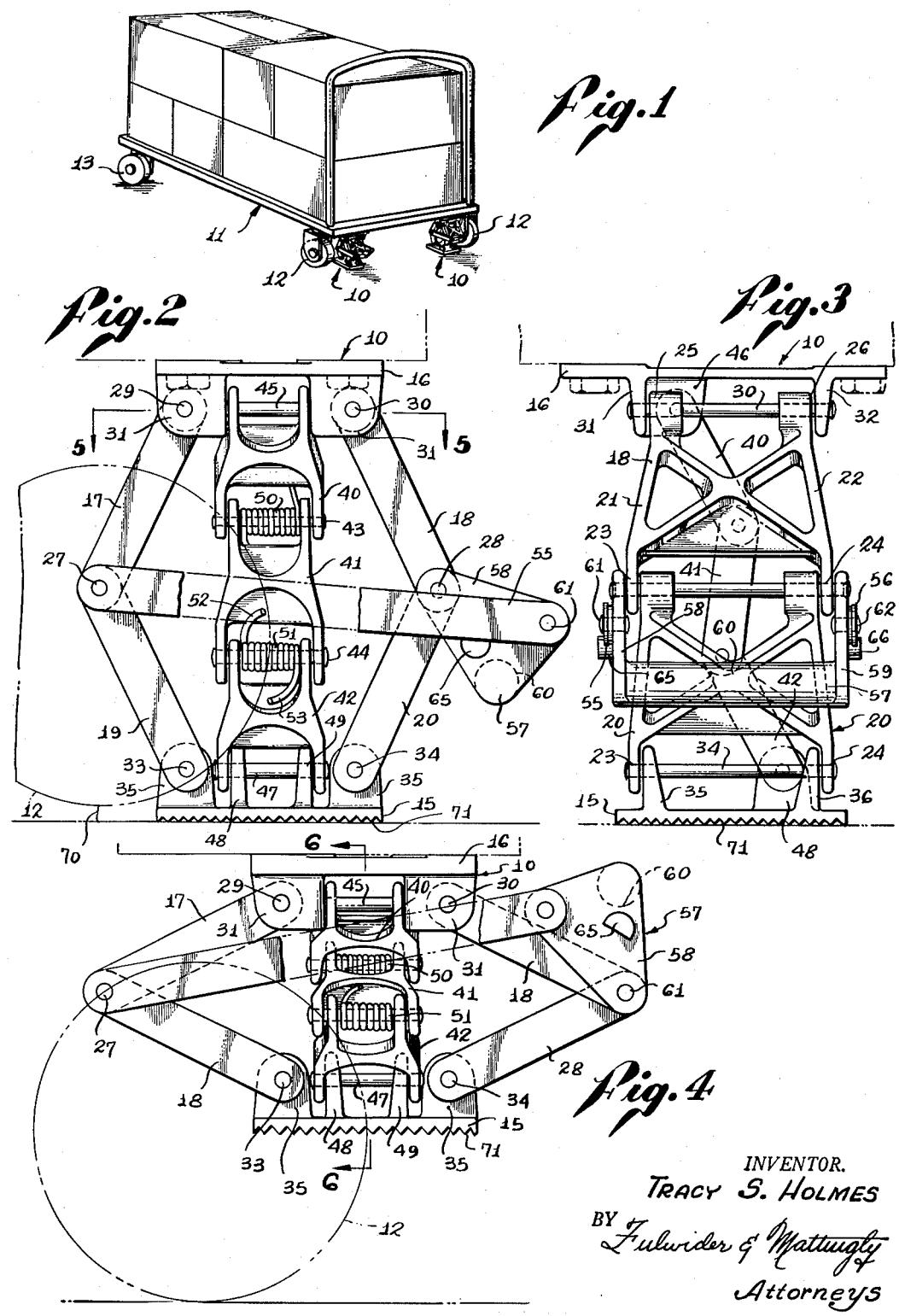
INVENTOR.
TRACY S. HOLMES
BY Fulwider & Mattingly
Attorneys May 29, 1956　　　　T. S. HOLMES　　　　2,747,692
FOOT ACTUATED, GROUND ENGAGING BRAKE
FOR HAND TRUCKS AND THE LIKE
Filed Sept. 29, 1952　　　　　　　　　　2 Sheets-Sheet 2

INVENTOR.
TRACY S. HOLMES
BY
Fulwider & Mattingly
Attorneys

United States Patent Office 2,747,692
Patented May 29, 1956

2,747,692

FOOT ACTUATED, GROUND ENGAGING BRAKE FOR HAND TRUCKS AND THE LIKE

Tracy S. Holmes, Los Angeles, Calif.

Application September 29, 1952, Serial No. 312,063

4 Claims. (Cl. 188—5)

My invention relates generally to hand trucks and dollies for the transportation of crates, baggage, and similar heavy articles, and more particularly, to mechanisms for immobilizing such vehicles.

In the handling of heavy articles by means of wheeled dollies and trucks, it is desirable that such vehicles be capable of being firmly anchored or immobilized during the loading and unloading thereof. It is further desirable that the locking means be simple and quickly and easily operated by relatively inexpert personnel. Still further, it is desirable that such locking means be rugged and positive and provide a firm, immovable support capable of receiving any load to which the wheels of the dolly or truck would be subjected. While foot actuated brakes known generally in the art as foot locks for locking trucks and dollies have been available in the past, such prior devices have not been entirely satisfactory because of deficiencies in strength and ruggedness and awkwardness of operation. Also such devices often lacked sufficient ground clearance when retracted to provide for easy operation of the truck.

Bearing in mind the foregoing desiderat and the deficiencies of prior known devices, it is a major object of the present invention to provide a foot actuated brake for hand trucks, dollies, and the like, which is selectively operable to engage the ground and support the full weight of the load on the truck or dolly to which it is attached.

It is another object of the invention to provide a brake of the class described which is entirely independent of the wheels of the dolly, and thus capable of use with any of a wide variety of different types of wheeled vehicles.

It is still another object of the invention to provide a device of the class described which may be operated by the operator's foot, both to engage and to disengage, thus avoiding the necessity of stooping and fumbling under the truck or dolly to which the device is attached, and also avoiding the danger of pinched or injured fingers.

It is still another object of the invention to provide a device of the class described which is relatively simple, rugged, and capable of quantity manufacture.

The foregoing and additional objects and advantages of the invention will be apparent from the following detailed description of one preferred embodiment thereof, such consideration being given likewise to the attached drawings, in which:

Figure 1 is a perspective view of a hand truck equipped with foot actuated brakes embodying the present invention;

Figure 2 is a side elevational view of one of the brakes illustrated in Figure 1, the same being shown in a locked or immobile position;

Figure 3 is a front elevational view of the device shown in Figure 2;

Figure 4 is a side elevational view of the device shown in Figure 2, but with the same being in retracted or mobile position;

Figure 5:
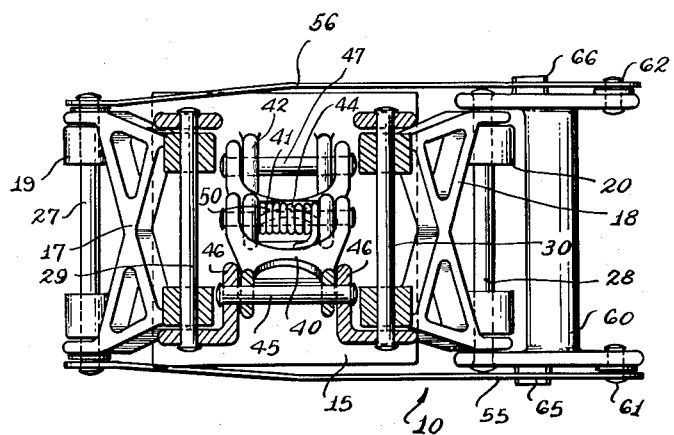
Figure 5 is a partially sectioned plan view taken on the line 5—5 in Figure 2.

In the drawings, I have illustrated the foot actuated brake generally by the reference character 10. In Figure 1, two brakes 10 are shown attached to one end of a four-wheel hand truck 11, of the type in which only the two front wheels 12 are dirigible so as to permit steering of the truck. When it is desired to immobilize the truck 11, the two brakes 10 are operated, as will hereinafter be described in detail, to engage the floor and lift the dirigible wheels 12 above the floor slightly. Thereafter, until the locks 10 are released, the front end of the truck 11 is supported on the two brakes 10 and the rear end on the two non-dirigible wheels 13 whereby the truck is immobilized, as for example, during loading and unloading operations.

Figure 6:
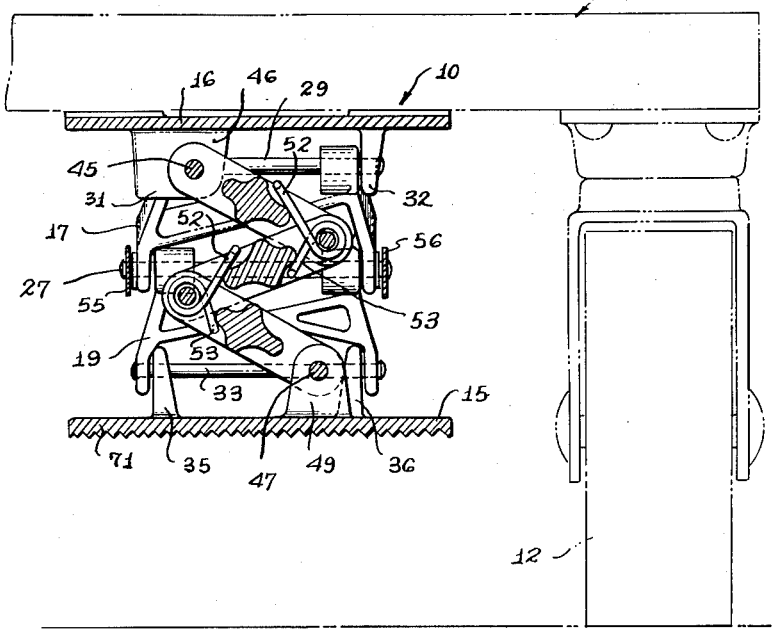
Figure 6 is an elevational section taken on the line 6—6 in Figure 4.

For a description of the brake 10, reference is now made to Figures 2 through 6. Each of the brakes 10 includes a base pad 15 interconnected by supporting struts 17, 18, 19 and 20 to an upper attachment plate 16. The plates 16 are secured to the undersurface of the bed of the truck 11 at points adjacent the wheels 12. In the interest of simplicity and economy of manufacture, the struts 17 through 20 are identical in form and construction, each comprising a frame-like structure (best seen in Figure 3) having a pair of cross braced side arms 21 and 22 with aligned pivot bearings 23 and 24 at the lower ends, and 25 and 26 at the upper ends thereof. The support struts 17 and 19, and 18 and 20 respectively, are hinged together by transverse shafts 27 and 28. The upper end bearings 25 and 26 of the struts 17 and 18 are pivotally connected to the attachment plate 16 by transverse shafts 29 and 30, received in downwardly extending flange members 31 and 32 of the attachment plate 16. The lower bearings 23 and 24 of the struts 19 and 20 are pivotally connected to the base pad 15 by transverse shafts 33 and 34, received in upstanding ears 35 and 36 formed in the base pad 15. All of the shafts 27, 28, 29, 30, 33 and 34 are parallel to each other whereby the struts 17, 18, 19 and 20, and the base pad 15 and attachment plate 16 all form a pantograph movement by which the base pad 15 may be moved upwardly or downwardly accompanied by a toggle-like hinging movement of the struts 17 through 20.

In order to prevent the pad 15 from shifting laterally with respect to the plate 16 or from becoming non-parallel with respect to the attachment plate 16, as would occur if there were to be greater flexure at the shaft 27 than at 28, for example, a series of three alignment struts or links 40, 41 and 42 are interconnected between the base pad 15 and the attachment plate 16. The links 40 through 42 are of identical construction, and interconnected in a manner similar to the struts 17 and 19, by means of transverse shafts 43 and 44. The upper end of the uppermost link 40 is connected to the attachment plate 16 by a pivot shaft 45 received in downwardly extending flanges 46 formed in the attachment plate 16. The lower end of the lowermost link 42 is similarly attached to the base pad by a shaft 47 parallel to the upper shaft 45 and received in upstanding ears 48 and 49 formed in the base pad 15. The shafts 43, 44, 45 and 47 are all parallel to each other, and oriented at substantially 90° to the shafts 27, 28, 29, 30, etc., whereby the base pad 15, while free to move in translation upwardly and downwardly as aforesaid, is at all times maintained parallel to, and directly below, the attachment plate 16. It will be realized that the purpose of the links 40—42 could be as readily accomplished by only two links hinged together and attached at the shafts 45 and 47 to the plate 16 and pad 15, respectively. In the interests of maintaining all of the moving parts within the confines of the entire mechanism, however, I prefer to make the links shorter and employ three.

The base pad 15 is at all times urged toward the retracted position shown in Figure 4 by a pair of torsional springs 50 and 51 received on the link shafts 43 and 44, and having their extending ends 52 and 53 engaged with the adjoining links and disposed and stressed to urge flexure at the respective shafts 43 and 44. Thus, if the device were not otherwise restrained, the base pad 15 would at all times be drawn up and held in the retracted position shown in Figure 4 by the torsional force of the springs 50 and 51.

In order to move the base pad 15 to its lowermost or locked position and retain it in that position, a pair of toggle arms 55 and 56, and an operating lever 57 are arranged to interconnect the two hinge pivot shafts 27 and 28.

The operating lever 57 comprises a pair of side arms 58 and 59 of generally triangular configuration, interconnected by a transverse toe bar 60. The inner ends of the side arms 58 and 59 are pivotally connected to the transverse pivot shaft 28 to permit swinging of the operating lever 57 through an angle of something over 90° from the retracted position shown in Figure 4 to the locked position shown in Figure 2, or vice versa. The right-hand ends of the toggle bars 55 and 56 are connected to the outer ends of the side arms 58 by pivotal rivets 61 and 62, and the left-hand ends of the toggle bars 55 and 56 are pivotally connected to the transverse shaft 27. Thus, it will be seen that rotation of the operating lever from the position shown in Figure 4 to the position shown in Figure 2 exerts tension on the toggle arms 55 and 56, and compression on the side arms 58 and 59 whereby to urge the shafts 27 and 28 toward each other to straighten out the pantograph linkage of the strut pairs 17 and 19, and 18 and 20, respectively. Such straightening of the pantograph linkage exerts a strong downward thrust on the base pad 15. It will further be noted that, as the strut pairs 17 and 19, and 18 and 20, respectively, approach a position of vertical alignment, the downward force exerted on the pad 15 is relatively great for a relatively small tension in the toggle bars 55 and 56. Furthermore, it will be noted that, under the condition just stated, the lever arm defined by the transverse shaft 28 and the pivotal rivets 61 and 62 is in a position of alignment with a horizontal line defined by the shafts 27 and 28 whereby the tension in the toggle arms 55 and 56 is at a maximum with respect to the torque applied to the operating lever 57. Thus, it will be seen that by a relatively light pressure exerted with the toe on the transverse bar 60, the operator can cause the brake 10 to lift a very substantial load on the truck 11.

In order to retain the brake in its lowered or locked position, the operating lever 57 is so constructed as to permit the swinging movement thereof to continue "over center," that is, beyond the point at which the shafts 27 and 28, and the rivets 61 and 62 are aligned. Upon such "over center" movement the tension in the toggle arms 55 and 56 tends to cause continued rotation of the operating lever 57 in the direction in which it was just rotated. To prevent such continued rotation, however, the side arms 58 and 59 are formed with stops 65 and 66 which extend outwardly to engage the downwardly swinging toggle arms 55 and 56, thus to prevent continued rotation of the operating lever 57 in a downward direction.

Thus, the base pad 15 is maintained in its lowermost position by the tension in the toggle arms 55 and 56 urging the same to swing downwardly against the stops 65 and 66. Inasmuch as the toggle arrangement of the arms 55 and 56, and the operating lever 57 is such that they are very close to "center," whereby a minimum of torque is required to rotate the lever 57, a relatively light upward pull with the toe under the transverse bar 60 is required to release the lock 10 and permit the springs 50 and 51 to lift the base pad 15 to its retracted position shown in Figure 4.

The proportions of the brakes 10 are such that at the time the base pad 15 is in the locked position shown in Figure 2, the dirigible wheel 12 is lifted slightly above the floor or the supporting surface, as indicated at 70. The lower surface of the pad 15 may be serrated, as indicated at 71, if desired, in order to provide a non-skid surface giving further assurance of the immobility of the truck 11 during loading and unloading operations.

In some types of trucks having relatively narrow beds, it may be desirable to interconnect the transverse bars 60 in the two adjacent brakes 10 whereby a single foot operation is all that is required to operate both locks. Furthermore, in some instances it may be desirable to place foot actuated brakes 10 at all four corners of the truck, particularly in instances where the same are employed with dollies or trucks in which all four wheels are dirigible. Also, it will be noted that the arrangement just described has the further advantage of removing all of the load from all of the wheels of the dolly or truck whereby to permit the changing of pneumatic tires, if such are used, or adjustment of the wheels.

In still other applications than those just described, a single brake at one end of the dolly may be all that is required to give the degree of immobility and rigidity required in the particular case.

While the construction shown and described herein is fully capable of achieving the objects and providing the advantages hereinbefore stated, it will be realized that it is capable of some modification without departure from the spirit of the invention. For this reason, I do not mean to be limited to the form shown and described, but rather to the scope of the appended claims.

I claim:

1. A foot actuated brake of the class described comprising: a horizontal base pad having three pairs of spaced upstanding ears thereon with horizontally aligned pairs of bearings in each pair of ears, two of said bearing pairs being arranged on parallel axes and one bearing pair on an axis transverse to said first axes; a horizontal plate above said pad having three pairs of pendant flanges thereon with horizontally aligned pairs of bearings in each pair of flanges, two of said last bearing pairs being on axes mutually parallel and parallel to those of said first two pairs, and the remaining bearing pair being aligned on an axis parallel to said transverse axis; shafts in all of said bearings; four substantially identical struts each comprising a cross-braced pair of spaced parallel arms with bearings in the ends of said arms aligned on axes transverse thereto, said struts being hinged together in pairs by hinge shafts received in said arm bearings at adjoining ends thereof and hinged at the other ends thereof to said shafts in said ear and flange bearings, respectively, whereby to interconnect said plate and pad with a pantograph linkage having six parallel pivot axes, said strut pairs being arranged to buckle outwardly or toward each other selectively to raise or lower said pad; at least two links hinged together and to said transverse hinge bearings in said ears and flanges on mutually parallel hinge axes transverse to said first six axes whereby to constrain movement of said pad to vertical translation; and toggle means interconnecting the respective hinge shafts of said strut pairs to urge said last hinge shafts toward or away from each other selectively to raise or lower said pad.

2. The construction of claim 1 further characterized by having a torsion spring interconnecting said links at the mutual hinge points thereof and stressed to urge flexure at said last hinge point to retract said pad upwardly.

3. The construction of claim 1 further characterized in that said toggle means includes: an arm connected at one end to one of said strut hinge shafts; and a lever connected at one end to the other strut hinge shaft and extending outwardly from said struts for pedal operation to swing the same about the hinge shaft to which it is connected, the respective other ends of said lever and arm being pivotally interconnected whereby said swinging of said lever effects relative movement of said hinge shafts to buckle said struts as aforesaid.

4. The construction of claim 3 further characterized in that said lever is arranged to swing to move the point of its attachment to said arm past a line defined by said strut hinge points when said pad is at a lower limit of its movement, and having stops formed in said toggle means to limit the swinging of said lever at a point just past said line whereby to provide an over-center lock to hold said pad in extended position.

References Cited in the file of this patent

UNITED STATES PATENTS

| | | |
|---|---|---|
| 732,418 | King | June 30, 1903 |
| 1,562,016 | Vesely | Nov. 17, 1925 |
| 1,756,220 | Stackpole | Apr. 29, 1930 |
| 1,859,830 | Kummel | May 24, 1932 |
| 2,097,032 | Marlowe | Oct. 26, 1937 |
| 2,169,508 | Ulrich | Aug. 15, 1939 |
| 2,236,281 | Anderson | Mar. 25, 1941 |
| 2,360,874 | Herold | Oct. 24, 1944 |